*INVENTOR.*
Guillermo Kenneth Taylor

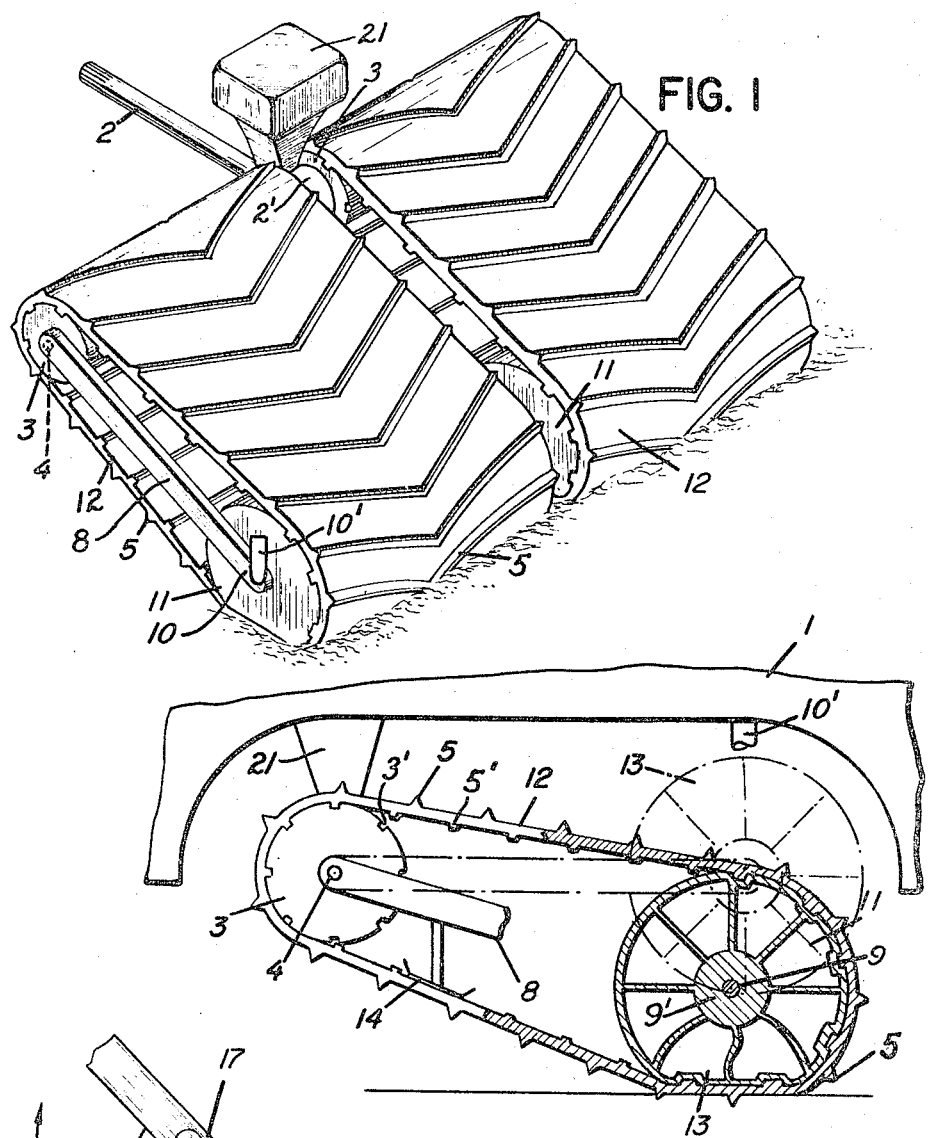
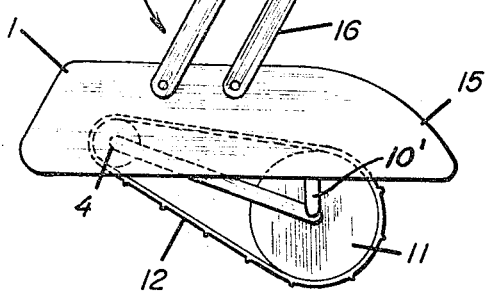

United States Patent Office 3,311,424
Patented Mar. 28, 1967

3,311,424
TRACTIVE DEVICE COMPRISING A BELT
DRIVEN SOFT ROLLER
Guillermo K. Taylor, Acassuso, Buenos Aires, Argentina
(% Marval & O'Farrell, Carlos Pellegrini 885, Buenos
Aires, Argentina)
Filed June 3, 1965, Ser. No. 463,468
17 Claims. (Cl. 305—12)

The present invention relates to a tractive device for all types of vehicles and more particularly to an endless belt and resilient roller or low pressure tire device, which provides a new mode of driving a vehicle particularly over soft or irregular terrain including water and hereinafter called "off-road vehicles," and is a continuation-in-part of my co-pending application Serial No. 319,303, filed October 28, 1963, now abandoned.

The tractive device for vehicles of the present invention comprises a driving pulley connected to a driving source, a resilient roller supporting at least part of the weight of said vehicle, while said driving pulley is substantially freed from supporting the weight of said vehicle, said resilient roller being spaced apart at a predetermined substantially constant distance from said driving pulley, an endless flexible belt encircling both said pulley and roller and adapted to transmit the driving force from the periphery of said pulley to the periphery of said roller, said resilient roller being adapted to roll on the ground through said endless belt and both roller and belt being adapted to substantially adopt the shape of the ground at the pertinent portion in contact therewith due to the resiliency of said roller bearing in mind the weight said roller supports.

The present invention may also be defined as comprising a driving pulley and a resilient roller whose external surface is in permanent contact with the ground through an endless belt in a first plane perpendicular to the vertical plane which passes through the center of the roller, said endless belt encircling said roller and being driven by the pulley, which in turn drives the resilient roller.

As a preferred, but not indispensable feature of this invention, the roller or low pressure tire may be subdivided into radially spaced sealed compartments, so as to obtain particular results to be later described.

Thus, the present invention may be defined as referring to a tractive device for vehicles, particularly for off-road vehicles, to be used on irregular as well as on soft terrains including water, comprising a driving pulley, a resilient roller spaced apart from said driving pulley, an endless belt having a width substantially equal to that of said resilient roller, said endless belt encircling said pulley and roller, said resilient roller being generally only destined to support at least a portion of the weight of the vehicle without transmitting torque, said resilient roller being deformable over the portion contacting the ground through the pertinent portion of the belt surrounding it, said last mentioned portions of the roller and belt being capable of adjusting themselves to the irregularities of the ground and said pulley being adapted to transmit the drive and torque directly to said endless belt which thereby moves the vehicle.

Accordingly an object of the present invention is the provision of an inflatable vehicle traction device which has a highly flexible running surface of large area which provides excellent traction and is yieldable to surface obstructions without puncturing whereby said traction device is eminently suitable for use over rough or irregular terrain.

A further object is to provide a tractive device which does not require a suspension system.

A still further object of the present invention is to provide improved overload capabilities for the tractive device.

Another object of the present invention is to overcome various deficiencies of the prior art.

A further object of the present invention is to provide a tractive device providing greater ground clearance with regard to the body of the vehicle.

Another important object is to provide a tractive device that will not damage the ground, and may therefore be used in tractors travelling over golf courses, gardens and other special surfaces.

Still another object of the invention is to provide a removable tractive device for rough use vehicles, which will serve the purpose of adapting the vehicle so that it may be used on soft or irregular terrain, when conditions require it.

In order to facilitate the comprehension of the present invention, reference will now be made, by way of example, to several embodiments.

In the drawings:

FIG. 1 is a schematic perspective view of a first embodiment of the tractive device of this invention.

FIG. 2 is a partial schematic side view of a vehicle including the tractive device of FIG. 1, shown in two operative positions.

FIG. 3 illustrates an application of the invention, more particularly when it is included in an aircraft.

In the several figures the same reference numerals identify same or corresponding parts.

Figure 4:
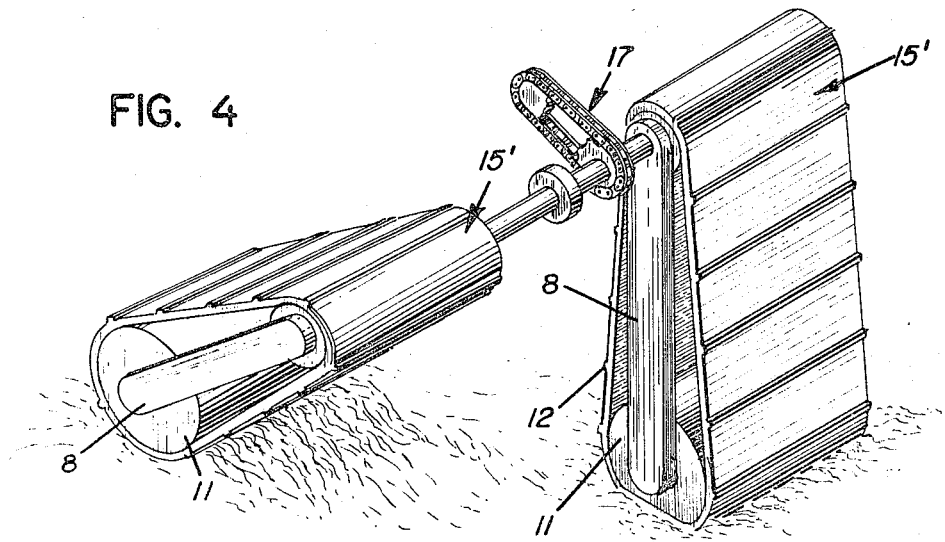
FIG. 4 is a schematic perspective view of an alternative embodiment of the tractive device.

As may be seen from FIG. 1, the tractive device of the present invention comprises in this embodiment two pulleys 3 mounted on shafts 4 drivingly connected to driving means and more particularly to a propeller shaft 2 through a differential 2'. It will be obvious to those skilled in the art that the invention is likewise applicable to a single pulley 3.

The word pulley is to be interpreted not only as defining a narrow rotatable cylindrical member, but also a rotatable member of substantial width.

The tractive device is supported by the vehicle body 1 (FIG. 2), in this particular case by the rear portion thereof. To this end a coupling pillar 21 (FIGS. 1 and 2), only schematically shown, enables the tractive device to be coupled to the vehicle body 1.

The weight of the vehicle body, at least as far as the rear portion in this particular embodiment is concerned, is supported by the rollers 11, as will be later explained.

To facilitate the further description reference will now only be made to one pulley 3 and one resilient roller 11.

The external face of the pulley 3 may have grooves 3' (FIG. 2) which can mesh with an endless belt 12 which has corresponding projections 5' on its internal face for this purpose.

The outer face of the belt 12 may be provided with projections 5 to increase the frictional engagement with the ground.

A floating frame 8 defining a spacer bar is linked at one end to the shaft 4 of pulley 3, while its other end portion 10 (FIG. 1) is journalled to shaft 9 (FIG. 2), shaft 9 forming part of a hub 9' of a resiliently soft roller 11, which may also be a low pressure tire or may alternatively be filled with a fluid (for example oil) and may be used for its transportation.

Flexible endless belt 12 encircles pulley 3 and roller 11 and transmits drive from pulley 3 to roller 11.

The end portion 10 is connected to the body 1 of the vehicle by means of schematically illustrated load supporting means 10' (see FIGS. 1 and 2). Accordingly, all the weight placed at least on the rear portion of the vehicle body 1 is supported by roller 11, and it is this weight that produces the deformatiton of roller 11 as is clearly illustrated in FIGS. 1 and 2.

The width of the pulley 3, roller 11 and flexible endless belt 12, which is driven by the driving pulley 3 can be increased considerably, thus increasing the area of contact with the soil, thereby reducing the weight which the latter must support per unit area.

The resilient roller 11 is in contact with the ground through the endless belt 12. As endless belt 12 is of small thickness, it is extremely flexible, and accordingly takes the shape of roller 11 over the whole portion where they are in contact.

It will be noted that over heating problems of the endless belt 12 are minimized due to the large portion of the path of said belt which is free from contact with any rotating member.

As has already been stated, the internal and external surfaces of the belt 12 present a plurality of projections 5 and 5' which are convenient in order to increase the friction and consequently the adhesion thereof to the soil and to pulley 3, over which belt 12 travels, thus providing the necessary adhesion for a good driving contact.

Since the low pressure tire or resilient roller 11 is inherently shock absorbing it may pass over uneven ground without transmitting undue shock to the body 1, and therefore additional suspensional means are not essential, but if for any reason the vertical movements of the shaft 9 are too violent, shock absorbers, springs, leaf springs, torsions rods etc., can be used.

In order that a resilient roller with low pressure may operate effectively as a damper, its resistance to deformation should be progressive, and this only happens to a limited extent if it has the internal layout of a conventional tire, because all the air contained in it is compressed simultaneously.

In order to avoid this, the roller may be divided in closed compartments 13 radially arranged, and accordingly when the vehicle is loaded, only those compartments 13 near the ground will be deformed, thus compressing the ones that receive the weight of the vehicle at a particular moment. As the pressure in the deformed compartments rises faster than that of the roller 11 as a whole, without compartments, it provides the progressive resistance which is required (FIG. 2).

For safety purposes, a cleaning element formed by an inclined metal blade 14 (FIG. 2) is resiliently fitted to the floating bars in such a way that the movement of the belt will cause any foreign particles which may accidentally enter, to be pushed against the said plate and be forced outwards. The same effect could be achieved by means of a brush or jets of compressed air.

In FIG. 2, two positions (one shown in dotted lines) have been illustrated for the roller 11 and the spacer bar 8. These two positions are not exclusive, and may be varied in accordance with any preestablished requirements, as long as the main object of the novel device is fulfilled.

Furthermore, any braking system may be added to the driving pulley 3 either using the pulley 3 itself or some additional known means in operative relationship with shaft 4.

In some cases (FIG. 3) the system 15 may be suspended by means of linked arms 16, to the body 17 of, for example, an aircraft. The arms 16 can be moved by mechanical, electrical or hydraulic servomechanisms to raise or lower the unit, facilitating passage over obstacles or to retract the unit when used as an undercarriage of an aircraft.

In FIG. 4 an alternative embodiment has been illustrated and wherein it may be seen that the invention also provides for differently levelled stretches of terrain, by using a variable position tractive device having sub-unit 15' mounted on one and the other side of the vehicle (not shown).

Pulley 3, roller 11, belt 12 and floating frame 8 define each of the variable position sub-units 15' which may be rotated in such a way that the vehicle remains horizontal notwithstanding the unevenness of the ground, or in order to pass over obstacles or to place said vehicle in any particular position.

The rotation of, for instance, one of the sub-units 15' will be caused by suitable means only schematically illustrated by a chain and gear arrangement 17 which may be controlled from the driver's seat.

Figure 5:
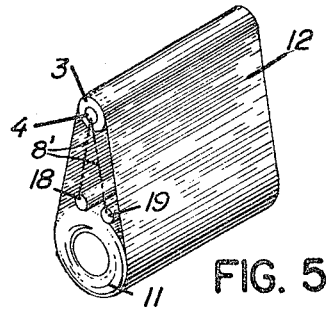
FIG. 5 is a schematic perspective view of a second possible alternative.

The floating bar 8 has so far been used in all the embodiments described, but is not an irreplaceable device. For instance in FIG. 5 a pair of load supporting rollers 18, 19 bear on the resilient roller 11. These load supporting rollers 18, 19 are linked by schematically illustrated floating bars 8', 8' to shaft 4 of pulley 3 and thereby maintain a constant distance between shaft 4 and the axis of roller 11. Upon the vehicle resting on roller 11 the weight is transmitted to load supporting rollers 18, 19 and therefrom through floating bars 8', 8' to the shaft 4.

Accordingly, the load is now indirectly transmitted to roller 11, but similarly as in the former embodiments, the torque is transmitted to the periphery of roller 11 through belt 12.

Figure 6:
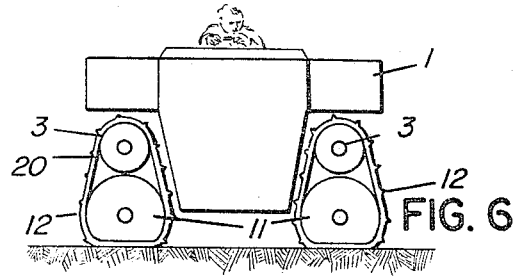
FIG. 6 is a schematic front view of another alternative embodying the present invention.
Figure 7:
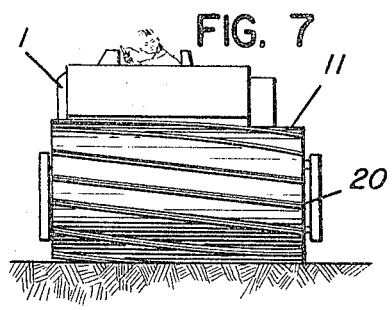
FIG. 7 is a side view of the embodiment illustrated in FIG. 6, showing further details.

If necessary the roller 11 can be made to give sufficient lift in the water for the vehicle to float, the rotation of the roller 11 driving it backwards or forwards. To this end, roller 11 can be placed in such a position that its axis is parallel to the direction of movement of the vehicle (FIGS. 6 and 7) using a pair of tractive devices and if the endless belt is provided with transversal grooves 20, the part of the belt that is in contact with the water will function like an Archimedean screw due to the grooves that define a developed helicoid.

The vehicle may be propelled in a similar way over ice or snow, as in this manner the area of snow that suffers mechanical deformation will be reduced to a minimum with the consequent reduction in its resistance to movement. Moreover, as snow has a low frictional coefficient, the friction between snow and the belt would be negligible. The direction of the vehicle could be changed by varying the speed of one roller or another as in conventional crawler tractors.

While only reference has been made to "a belt" when referring to member 12, it is obvious that in some particular cases other means such as for instance a chain belt could be used and accordingly the expression "belt" should be interpreted in this broad sense.

Returning once more to FIG. 2 it can be seen that the flat portion of roller 11 defines a first plane which is perpendicular to the vertical plane which passes through the axis of shaft 9 which is the center of the roller. The expression "first plane" hereinbefore used is to be considered as defining the general plane of the ground notwithstanding that the latter may be irregular.

If desired, the tractive device may also be used in a reverse sequence of operation such as for transmitting rotational power to a vehicle which is being pulled along the ground. This arrangement may be used for instance in certain agricultural implements. In this event, the driving pulley becomes a driven pulley and the torque is transmitted through the belt towards said pulley upon such a vehicle moving along the ground.

The loaded radius of a tire or wheel is the radial distance from the center of the shaft to the surface on which a mounted tire or wheel rests at rated load. In the instant case, the loaded radius is therefore the distance from the center of shaft 9 directly downward to the outer surface of the flat part of roller 11, since the roller itself does not contact the ground but rather contacts belt 12 which in turn contacts the ground, as seen in FIG. 2.

The footprint of a tire or wheel is the contact area of the tire with the ground when the tire is loaded to its rated capacity. In the instant case, since the roller does not directly contact the ground, it is preferable to use the expression "projected footprint" and this is the area of the surface of the roller which contacts that portion of the belt which in turn contacts the ground. In other words, the projected footprint is that area of the roller 11 which would contact the ground in the absence of belt 12, and is the bottom surface of the flat portion of roller 11, as seen in FIG. 2. The width of the projected footprint is measured in the direction parallel to the axis of shaft 9 of the roller, and the length of the projected footprint is measured in the direction perpendicular to the axis of the roller 11.

In the illustrated embodiment, as is readily apparent in the drawings, the length and width of the projected footprint are each greater than the loaded radius of the projected footprint.

I claim:

1. A tractive device for vehicles, comprising a driving pulley and a resilient roller having an external surface, an endless belt encircling the external surface of said roller and said pulley and being driven by said pulley and which in turn drives the roller, said endless belt being in contact with the ground in a first plane perpendicular to the vertical plane which passes through the center of the roller, said roller being divided into radially disposed closed compartments.

2. A tractive device as set forth in claim 1, wherein said driving pulley has a shaft and a floating bar is connected to said shaft to support another shaft on which said resilient roller is mounted.

3. A tractive device as set forth in claim 1, wherein said pulley has grooves on its surface and said endless belt has projections on its internal and external faces, said projections of said internal surface meshing with said grooves.

4. A tractive device as set forth in claim 1, wherein the interior of said roller serves as a container for a fluid.

5. A tractive device as set forth in claim 1, wherein said device is joined to the body of a vehicle by articulated arms.

6. A tractive device as set forth in claim 5, wherein said articulated arms are moved by servomechanisms.

7. A tractive device as set forth in claim 1, wherein said endless belt has grooves on the external face which form a developed helicoid.

8. A tractive device as set forth in claim 1, wherein said elastic roller rests on load bearing rollers.

9. A tractive device as set forth in claim 3, wherein the internal face of said endless belt has a cleaning element.

10. In a vehicle comprising a body and driving means; a rotatable pulley connected to the driving means; a resilient roller with a centrally disposed shaft, load supporting means connected between said body and the centrally disposed shaft; a flexible endless belt surrounding the driving pulley and the soft roller for transmitting torque from the driving means to the periphery of the resilient roller; a spacer bar between the center of the pulley and said shaft; said endless belt being in contact with the ground in a plane perpendicular to the vertical plane drawn through said shaft, the contact surface being of substantial area, said roller being divided in radially disposed closed compartments.

11. A tractive device for off-road vehicles having a body and driving means, comprising a rotatable pulley connectable to the driving means; a resilient roller with a centrally disposed shaft, load supporting means connectable between said body and the centrally disposed shaft, a flexible endless belt surrounding the driving pulley and the roller for transmitting torque from the driving means to the periphery of the roller; a spacer bar between the center of the pulley and said shaft; said endless belt being in contact with the ground, in a plane perpendicular to the vertical plane drawn through said shaft, the contact surface being of substantial area, and said roller being divided in radially disposed closed compartments.

12. A tractive device for vehicles of the type to be moved over soft or irregular ground, comprising a driving pulley having a first periphery, a resilient soft driven roller mounted for rotation about an axis and having a second periphery defining a highly flexible running surface yieldable and deformable to surface obstructions, said driven roller being spaced from said driving pulley, an endless belt contacting a portion of said first periphery and encircling said second periphery and contacting a portion of said second periphery to transmit torque from said first periphery to said second periphery, said endless belt being flexible to conform to the full shape of the portion of said second periphery which it contacts, all of said belt other than that portion contacting said second periphery being spaced above the lowermost surface of said second periphery so that, when said tractive device is on flat ground, the only portion of said belt which enters into contact with said ground also contacts said second periphery, the width and length of the projected footprint of said driven roller being at least as long as the loaded radius of said driven roller.

13. A vehicle comprising a tractive device according to claim 12, a body, driving means, means connecting said driving means to said driving pulley so that said driving means drives said driving pulley, and load supporting means connected between said body and said driven roller.

14. A vehicle according to claim 13 wherein said driven roller is mounted on a shaft disposed centrally thereof, said load supporting means being connected between said body and said shaft, and wherein there is provided spacer means between the center of said pulley and said shaft.

15. A vehicle according to claim 14 wherein said spacer means is a spacer bar.

16. A tractive device according to claim 12 wherein said belt contacts the ground in a plane perpendicular to the vertical plane passing through the axis of said driven roller, the contact surface being substantially symmetrical relative to said vertical plane.

17. A tractive device as set forth in claim 12, wherein said roller is divided into radially disposed closed compartments.

References Cited by the Examiner

UNITED STATES PATENTS

| | | |
|---|---|---|
| 1,394,328 | 10/1921 | Miller. |
| 1,989,573 | 1/1935 | Loutzkoy. |
| 2,074,389 | 3/1937 | Grant _____ 180—5 |
| 2,652,289 | 9/1953 | Bekker _____ 305—34 X |
| 2,714,011 | 7/1955 | Albee _____ 305—34 X |
| 2,802,541 | 8/1957 | Albee. |
| 3,011,576 | 12/1961 | Howes _____ 305—35 X |
| 3,023,826 | 3/1962 | Larson. |
| 3,107,924 | 10/1963 | Cushman. |
| 3,180,305 | 4/1965 | Gower-Rempel _____ 115—1 |

BENJAMIN HERSH, *Primary Examiner.*

R. J. JOHNSON, *Assistant Examiner.*